United States Patent [19]

Stroby et al.

[11] Patent Number: 4,865,631
[45] Date of Patent: Sep. 12, 1989

[54] VACUUM SEWAGE SYSTEM

[75] Inventors: Lennart Stroby; Ake Nilsson; Arne Ask, all of Bromolla, Sweden

[73] Assignee: Oy Wartsila Ab, Helsinki, Finland

[21] Appl. No.: 160,694

[22] Filed: Feb. 26, 1988

[51] Int. Cl.⁴ .............................................. B01D 53/00
[52] U.S. Cl. ....................................... 55/163; 55/216;
 55/459.1; 210/188; 210/512.1; 210/532.2;
 4/378; 4/380
[58] Field of Search .................. 210/532.1, 532.2, 188,
 210/512.1, 109, 539; 55/164, 182, 459, 191, 204,
 459, 191, 204, 459, 192, 216, 163; 4/380, 378

[56] References Cited

U.S. PATENT DOCUMENTS

| 1,303,358 | 5/1919 | Montgomery | 210/532.2 |
| 2,057,203 | 10/1936 | Payzer et al. | 210/539 |
| 2,284,737 | 6/1942 | Hirshstein | 210/539 |
| 2,785,766 | 3/1957 | Murdock | 55/204 |
| 3,629,099 | 12/1971 | Gahmberg et al. | 210/532.1 |

FOREIGN PATENT DOCUMENTS 2381722 9/1978 France .............................. 210/532.2

Primary Examiner—Bernard Nozick
Attorney, Agent, or Firm—Dellett, Smith-Hill and Bedell

[57] ABSTRACT

A waste tank for a vacuum sewage system comprises a top wall having a major portion and also having a generally cylindrical dome structure which projects upwardly from the major portion of the top wall. The horizontal sectional area of the dome is substantially smaller than the maximum horizontal sectional area of the tank. The top wall is formed in the dome structure with an inlet opening for admitting air and sewage to the tank and an outlet opening for exhausting air from the tank.

18 Claims, 3 Drawing Sheets

VACUUM SEWAGE SYSTEM

BACKGROUND OF THE INVENTION

This invention relates to a vacuum sewage system, particularly for use aboard vehicles such as aircraft, boats, buses and trains, particularly high-speed trains.

A vacuum sewage system installed in a vehicle includes a waste tank for collecting and temporarily storing sewage. The tank has an inlet opening for connection through a sewer pipe to a source of sewage, such as a toilet, and admitting air and sewage to the tank, and an outlet opening for exhausting air from the tank. The outlet opening is connected through a duct to the suction side of a vacuum generator, for instance a blower, the pressure side of which vents to the atmosphere. Operation of the vacuum generator may be controlled by a pressure sensor, which is located in the duct immediately upstream of the vacuum generator, in the tank or in the sewer pipe, and normally functions to maintain a pressure difference between the tank and the interior of the vehicle above a threshold level, or to produce such a pressure difference when flushing of a toilet, or another sewage-supplying operation, is initiated. In the case of a vacuum sewage system installed in an aircraft, the vacuum generator is not needed when the pressure outside the aircraft cabin is sufficiently low to create the desired pressure difference.

In operation of such a vacuum sewage system connected to a toilet, flushing of the toilet is initiated by actuating a flush button. The pressure sensor disables the flush button from initiating a flushing cycle if the pressure difference sensed by the pressure sensor is below the threshold value. The tank is also provided with a level sensor for disabling the flush button when the tank is full. When a flushing cycle is initiated, a discharge valve connected between the sewer pipe and the toilet bowl is opened. The pressure difference between the interior of the toilet bowl and the interior of the sewer pipe causes sewage in the toilet bowl to be propelled from the bowl into the sewer pipe. Air enters the sewer pipe behind the sewage and pushes it towards the tank. The discharge valve is held open for a predetermined time and then closes. After the discharge valve is closed, the sewage in the sewer pipe continues to travel towards the tank as the air upstream of the sewage expands. The flushing cycle is then complete and a new flushing cycle may then take place. Preferably, it takes only one flushing cycle to transport sewage from the toilet to the waste tank. When the sewage enters the waste tank, it does so at quite a high speed. Accordingly hard objects, such as small bottles, may impinge on the tank wall with a substantial impact and there is a danger that the tank will be damaged, especially in the case of a vacuum sewage system installed aboard an aircraft since, in order to minimize weight, the waste tank may be of relatively flimsy construction.

It has been proposed that the inlet opening for the waste tank of an aircraft vacuum sewage system be formed in the horizontal top wall of the holding tank and be coupled to the sewer pipe by a connection fitting which makes the sewage enter the tank in a direction vertically downwards. In accordance with this proposal, the outlet opening is spaced from the inlet opening and is provided with a separator for preventing water from leaving the tank.

The proposed aircraft vacuum sewage system is subject to disadvantage, in that negative gravity caused by aircraft movement may cause the separator to become blocked by sewage. The pressure drop across the separator would increase, which may result in too high a pressure in the tank and in the sewer pipe. If the toilet was then flushed, there might not be sufficient vacuum in the waste tank for the sewage in the toilet bowl to be propelled completely into the sewer pipe. Consequently, there would be an increased probability that the discharge valve would be blocked. Moreover, sewage that had entered the separator may be pushed through the separator into the blower, which might result in damage to the blower. In order to avoid blockage of the separator, the level sensor should be placed so as to disable the flush button when the level of sewage in the tank reaches about 25 cm below the top of the tank. Typically, the height of the tank would be only about 75 cm, and therefore a large proportion of the volume of the tank would not be available for storage of sewage.

SUMMARY OF THE INVENTION

It appears that the separator of the waste tank of the proposed aircraft vacuum sewage system would be blocked because sewage and air entering the waste tank through the inlet opening impinge on the surface of the sewage in the tank and create a wave, which enlarges as the air expands. As the wave enlarges, it propagates away from the inlet opening towards the outlet opening and enters the separator.

A preferred embodiment of the invention is a waste tank for a vacuum sewage system. The tank comprises a top wall having a major portion and also having a generally cylindrical dome structure which projects upwardly from the major portion of the top wall and of which the horizontal sectional area is substantially smaller than the horizontal sectional area of the tank. The top wall is formed in the dome structure with an inlet opening for admitting air and sewage to the tank and an outlet opening for exhausting air from the tank.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

The invention will now be described with reference to an aircraft, but it should be understood the application of the invention is not limited to aircraft. The invention can be used as well in other vehicles in particular in boats, buses and trains. In an aircraft at an altitude such that there is a pressure difference of at least 16.5 cm Hg (corresponding to about one-fifth atmosphere at sea level) between the cabin pressure and the ambient pressure, vacuum for operating the system is available directly from the ambient atmosphere. Typically, cabin pressure is approximately equal to ambient pressure at an altitude of about 2,380 m, and sufficient pressure difference will exist when the aircraft is at an altitude greater than about 5,000 m.

Figure 1:
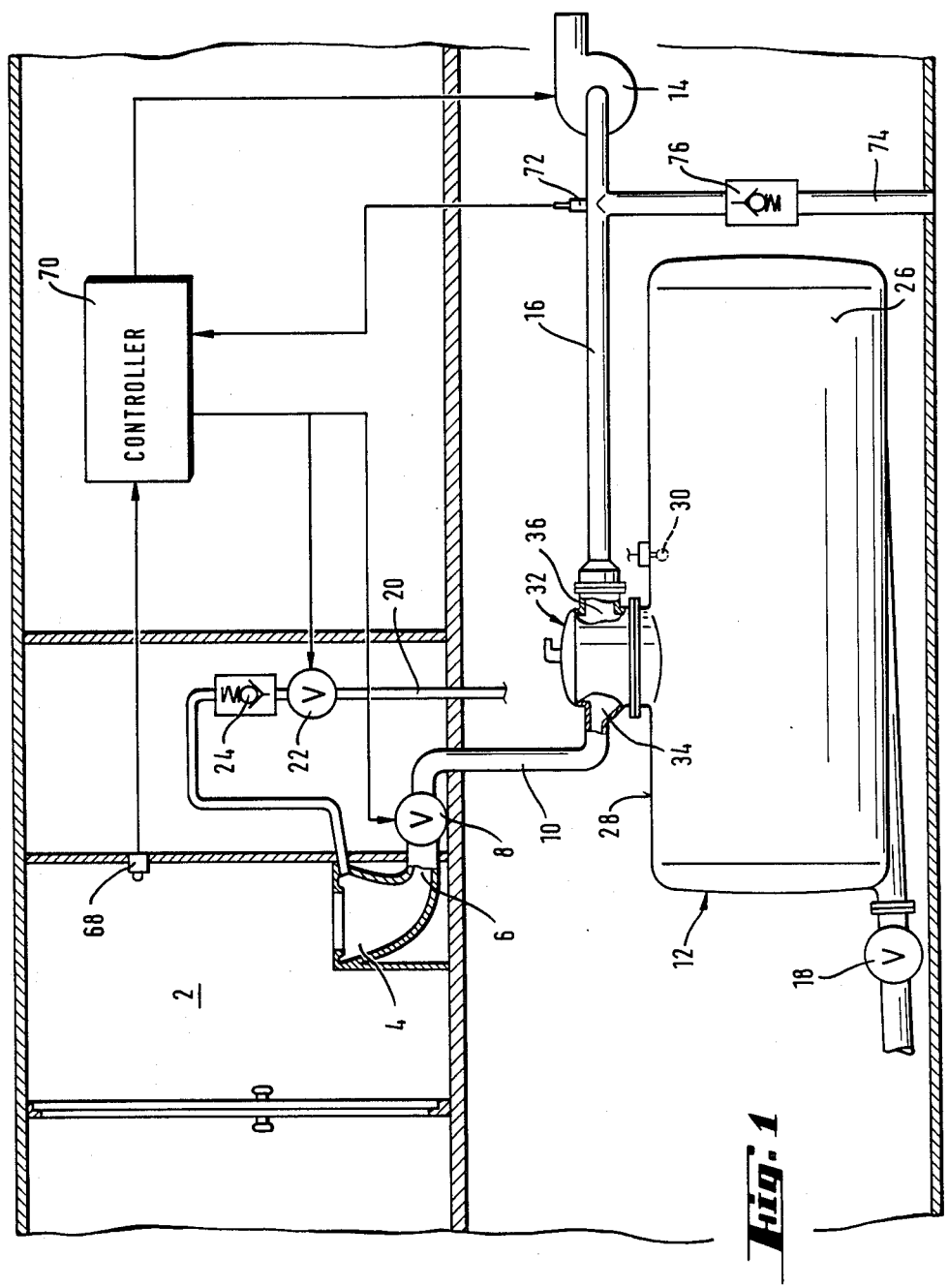
FIG. 1 is a diagrammatic illustration of part of an aircraft equipped with a vacuum sewage system.

The aircraft that is partially illustrated in FIG. 1 is pressurized and includes at least one toilet compartment 2 equipped with a vacuum toilet. The vacuum toilet comprises a waste-receiving bowl 4 which defines an interior space for receiving waste material and has an outlet opening 6. The outlet opening is connected to one side of a discharge valve 8. The opposite side of the discharge valve is connected through a sewer pipe 10 to a waste tank 12. The discharge valve 8 controls flow of material from the bowl 4 to the pipe 10 and the waste tank 12. An electrically driven blower 14 has its suction side connected to the tank 12 by way of an exhaust duct 16 for establishing a partial vacuum in the tank, and has its pressure side connected to the ambient atmosphere. The tank is also provided with a valve 18 or similar means for emptying the tank.

A flush button 68 is installed in the toilet compartment 2 and, when pressed, applies a signal to a controller 70. The controller responds to the signal provided by the flush button 68 by causing the discharge valve 8 to open. The controller 70 also controls operation of the blower 14. A pressure sensor 72 senses the pressure in the vacuum sewage system at a location that is normally in open communication with the interior space of the sewer pipe 10. For example, the pressure sensor might be positioned in the exhaust duct 16, just upstream of the blower. The pressure sensor provides a signal representing the pressure difference between the interior space of the sewer pipe 10 and the aircraft cabin pressure. The controller 70 responds to a signal indicating that the pressure difference has fallen below a threshold level by energizing the blower, so that a pressure difference above the threshold level is maintained substantially continuously. Alternatively, the controller might be programmed to energize the blower only when the pressure difference is below the threshold value and the flush button has been pressed, so that a pressure difference above the threshold level is maintained on an intermittent, as needed, basis. When the aircraft is at an altitude such that the difference between the cabin pressure and the ambient pressure is greater than about 16.5 cm Hg, the ambient atmospheric pressure, which is communicated to the tank by way of a by-pass duct 74 and a check valve 76, is sufficiently low to create the desired pressure difference, and accordingly the blower is not energized.

A rinse water supply pipe 20 opens into the bowl 4 by way of a spray nozzle arrangement adjacent the rim of the bowl 4. The rinse water supply pipe 20 is connected to a source of water under pressure. A remote-controlled, solenoid-operated or pneumatically-operated, rinse water valve 22 is connected in the water supply pipe 20. A vacuum breaker valve 24 is disposed downstream of the valve 22, to prevent reverse flow in the pipe 20 in the event that the pressure upstream of the valve 24 falls below the pressure in the waste-receiving bowl.

The waste tank 12 shown in FIG. 1 is generally cylindrical and is disposed horizontally, so that it is generally circular in vertical cross-section. The diameter of the tank typically is in the range from about 45 cm to about 180 cm, and the tank has a wall 26 which includes a top wall portion 28 extending over substantially the entire length of the tank. A level sensor 30 is positioned slightly beneath the top wall portion 28. The wall 26 also has a generally cylindrical dome structure 32 which projects upwardly from the top wall portion. The dome structure 32 may be about 15 to 30 cm in diameter and 20 to 30 cm high. Thus, the tank has a horizontal linear dimension in one direction that is from about 1.5 to 12 times a horizontal linear dimension of the dome. The length of the tank need be no greater than the diameter of the dome structure, but generally the length of the tank will be substantially greater than the diameter of the dome structure. For example, the tank may typically be 75 to 95 cm long, although it may be considerably longer, e.g. 200 cm. Therefore, in the case of a horizontally-disposed cylindrical tank, the horizontal sectional area of the dome is less than about 0.6 times the maximum horizontal sectional area of the tank. The dome structure defines an inlet opening 34 which is connected to the pipe 10 and an outlet opening 36 which is connected to the duct 16. The sewer pipe 10 is horizontal where it opens into the dome 32, and accordingly the flow of sewage and air that enters the dome by way of the sewer pipe 10 is directed horizontally.

Figure 2:
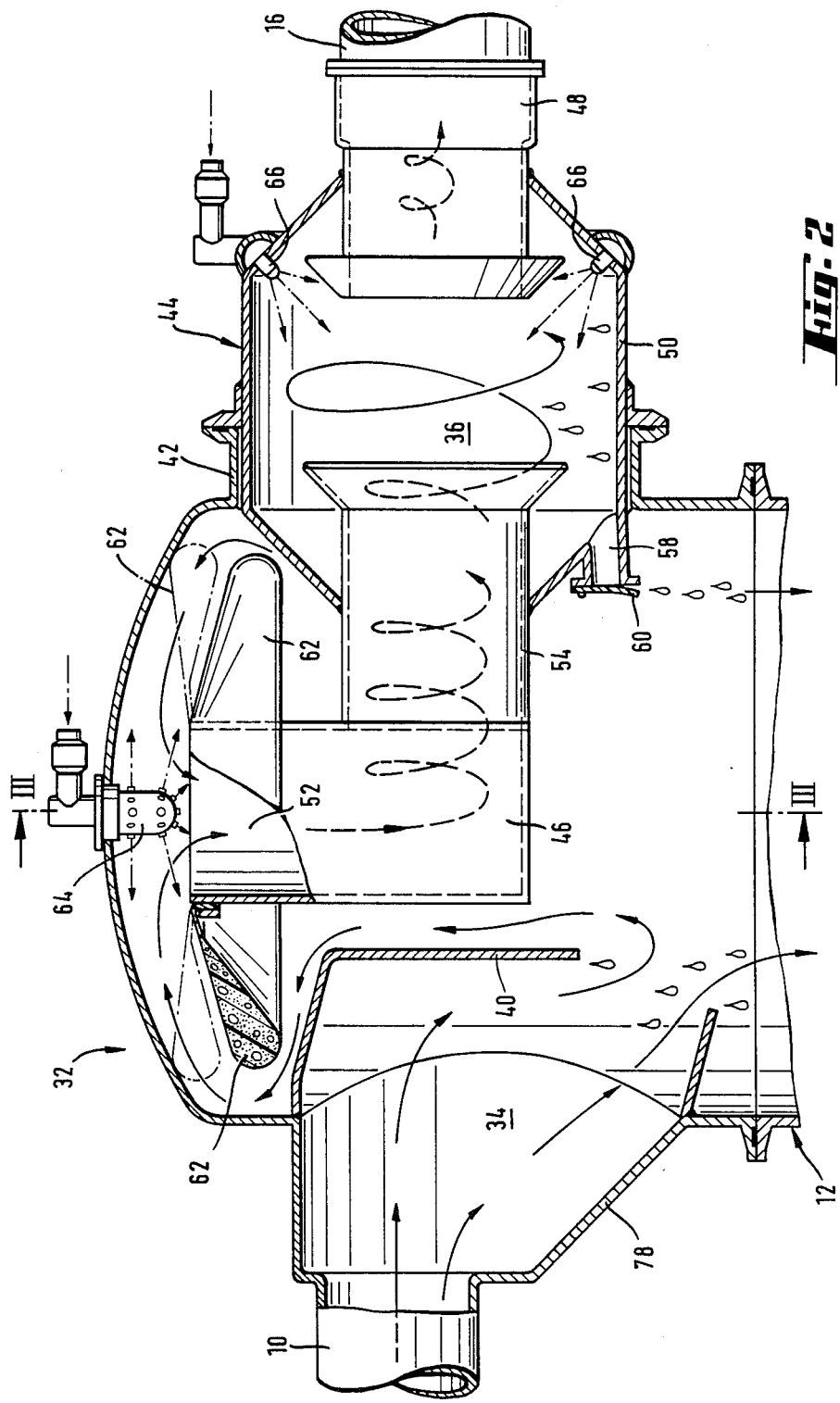
FIG. 2 is an enlarged view of part of the vacuum sewage system.

The dome structure is provided with an entrance box 78 (FIG. 2) where it is connected to the sewer pipe. The box 78 is substantially circular in vertical cross section, and its diameter increases in the direction of flow from the sewer pipe 10. Therefore, the velocity of air flowing through the sewer pipe 10 is reduced as it enters the entrance box. A vertical deflector plate 40 is mounted in the dome 32 to intercept the flow of sewage and air.

Figure 3:
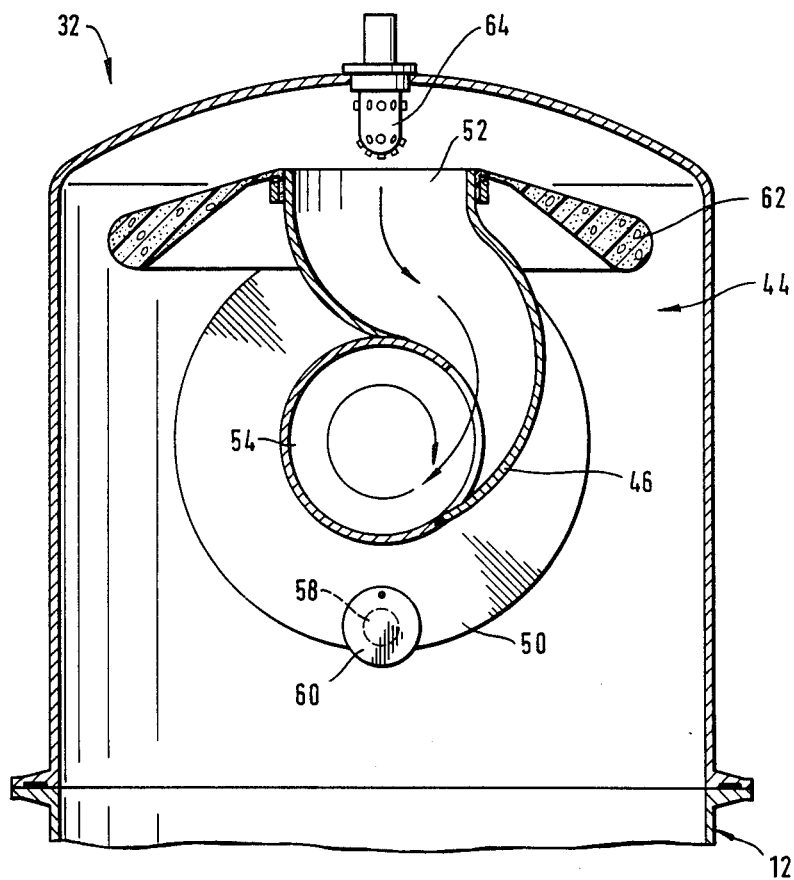
FIG. 3 is a sectional view taken on the line III—III of FIG. 2.

The outlet opening 36 is defined by a sleeve 42, which also is horizontal. The sleeve 42 accomodates a cyclonic separator 44 which has an inlet duct 46 inside the dome and an outlet duct 48 outside the dome. The inlet duct 46, which has an inlet port 52 (FIG. 3) near the top of the dome and opening upwards, is connected to the outlet duct 48 by a duct 54 and a separation section 50. The outlet duct 48 is connected to the exhaust duct 16. The action of the blower 14 draws air entering the dome from the sewer pipe 10 under the deflector plate and upwardly toward the top of the dome. At the top of the dome, the air enters the inlet port 52 and is drawn sequentially through the inlet duct 46, the duct 54, the separation section 50 and the outlet duct 48. The air passing through the dome structure therefore follows a serpentine path. Mist particles entrained in the air flow will follow this same path and will enter the inlet duct 46. The walls of the inlet duct 46 converge in accordance with a spiral form, and accordingly air that enters the duct 54 from the inlet duct 46 has a strong rotational component of velocity about the central axis of the duct 54. Therefore, air passes through the duct 54 along a helical path. The outlet 48 is axially aligned with the duct 54 but is spaced therefrom by a distance of about 6 cm. The separation section surrounds the ends of the two ducts 48 and 54. When air, with mist particles entrained therein, leave the duct 54, the mist particles are thrown away from the common axis of the ducts 48 and 54 by centrifugal force and are thereby separated from the air. The mist particles hit the interior surface of the separation section 50, where they form a film, and the thus-collected liquid is returned to the tank 12 by way of a drain passage 58. The drain passage 58 is provided with a closure flap 60 which stops air from being drawn into the separation section by way of the drain passage.

Larger droplets of water and small particles of sewage have sufficient momentum that when the air flow changes direction in order to pass under the deflector plate and upwards towards the top of the dome, the droplets and particles do not change direction but continue to travel downwards into the tank. The speed of these droplets and particles decreases because they are no longer entrained in the air flow. Somewhat smaller particles and droplets are separated from the air flow as its passes to the cyclonic separator. More massive particles have sufficient momentum that they strike the deflector plate and fall at relatively low speed into the tank. Any small hard objects entrained in the flow of sewage also strike the deflector plate, and therefore they do not impinge at high speed on the wall of the tank.

There is, of course, a possibility that small particles of sewage will enter the cyclonic separator 44 with the air flow and be separated therefrom in the separation section. In order to keep the interior of the separator clean, its internal surfaces may be coated wih PTFE or similar non-stick material and spray nozzles 66 are provided for periodically scouring and rinsing the interior surface of the cyclonic separator, e.g. when the tank is emptied.

There is also a possibility that wave motion of sewage in the tank would cause sewage to enter the dome. Entry of wave-borne sewage into the cyclonic separator is prevented by a closure member 62. In the illustrated embodiment of the invention, the closure member 62 is a reversing annular closure member. The closure member, which is less dense than sewage, is made of silicone rubber and its thickness increases from its inner periphery towards its outer periphery. The inner periphery of the closure member is connected to the periphery of the inlet port 52. Adjacent the inner periphery, the closure member is sufficiently thin that it can flex when the outer periphery of the closure member is urged upwards, for example if a wave of sewage enters the dome and reaches the level of the closure member. The outer periphery of the closure member then seals against the top of the dome and prevents sewage from entering the cyclonic separator. In order to keep the interior of the dome clean, its internal surfaces may be coated with PTFE or similar non-stick material and a spray nozzle 64 is mounted immediately above the inlet port 52 for scouring and rinsing the inlet duct 46 of the separator, the closure member 62 and the interior surface of the dome 32.

It will be appreciated that the present invention is not restricted to the particular embodiment that has been described and illustrated, and that variations may be made therein without departing from the scope of the invention as defined in the appended claims and equivalents thereof. In particular, the invention is not limited to a vacuum sewage system for transport vehicles. In the context of vacuum sewage systems for transport vehicles, the invention is not limited to use with aircraft. Moreover, the invention is not limited to use of the deflector plate and closure member in a tank having a dome structure of which the horizontal sectional area is substantially smaller than the horizontal sectional area of the tank: the dome structure may be the top end of a vertically-disposed tank.

We claim:

1. A waste tank for a vacuum sewage system, said tank comprising a receptacle portion for receiving sewage and a generally cylindrical dome structure which has a central axis, is in open communication with the receptacle portion, projects upwardly from the receptacle portion, and of which the horizontal sectional area is substantially smaller than the maximum horizontal sectional area of the receptacle portion, the dome structure defining an inlet opening for admitting air and sewage to the tank and an outlet opening for exhausting air from the tank, the inlet opening having a central axis which is substantially perpendicular to the central axis of the dome structure, and the tank further comprising a deflector plate mounted inside the dome structure in spaced relationship from the inlet opening and extending transversely relative to the central axis of the inlet opening.

2. A waste tank for a vacuum sewage system, said tank comprising a receptacle portion for receiving sewage and a dome structure which is in open communication with the receptacle portion, projects upwardly from the receptacle portion, and of which the horizontal sectional area is substantially smaller than the maximum horizontal sectional area of the receptacle portion, the dome structure defining an inlet opening for admitting air and sewage to the tank and an outlet opening for exhausting air from the tank, and the tank further comprising a duct which is disposed inside the dome structure and through which air flows in order to reach the outlet opening, and a closure member which is disposed inside the dome structure for inhibiting entry of solid or liquid material into the duct.

3. A waste tank according to claim 2, wherein the dome structure has a side wall and a top wall, the duct defines an inlet port, and the closure member is a reversing member having an inner periphery and an outer periphery, the closure member being secured at its inner periphery about the inlet port of the duct and having a first condition in which the outer periphery is below the top wall of the dome structure and air that enters the dome structure is able to pass to the inlet port, and a second condition in which the outer periphery engages the top wall of the dome structure and inhibits passage of material to the inlet port.

4. A waste tank according to claim 3, wherein the closure member is made of silicone rubber and its thickness decreases over at least a part of the range of its radius from its outer periphery to its inner periphery.

5. A waste tank for a vacuum sewage system, said tank comprising a receptacle portion for receiving sewage and a dome structure which has a side wall and a top wall, is in open communication with the receptacle portion, projects upwardly from the receptacle portion, and of which the horizontal sectional area is substantially smaller than the maximum horizontal sectional area of the receptacle portion, the dome structure defining an inlet opening for admitting air and sewage to the tank and an outlet opening formed in the side wall for exhausting air from the tank, and the waste tank further comprising a separator fitted in the outlet opening for removing water entrained in air leaving the tank and returning such water to the tank.

6. A waste tank according to claim 5, wherein the separator is a cyclonic separator and comprises first and second ducts which are in end-to-end alignment but are spaced from each other, inlet means for introducing air into the first duct in a manner such as to impart a rotational component of velocity to the air, and a shell which is coupled to the first and second ducts and has a wall portion which is at a greater distance from the central axis of the first and second ducts than the walls of the first and second ducts and is disposed so that it extends over a portion of the common axis corresponding to the space between the first and second ducts.

7. A vacuum sewage system which comprises:
   at least one waste-receiving bowl defining an interior space for receiving waste material and having an outlet, a waste tank comprising a receptacle portion for receiving sewage and a dome structure which is in open communication with the receptacle portion, projects upwardly from the receptacle portion, and of which the horizontal sectional area is substantially smaller than the maximum horizontal sectional area of the receptacle portion, the dome structure defining an inlet opening and an outlet opening, a sewer pipe connected to the inlet opening of the the waste tank, a discharge valve connected between the sewer pipe and the outlet of the waste-receiving bowl for controlling passage of material between the waste-receiving bowl and the sewer pipe, a vacuum generator, an exhaust duct connecting the vacuum generator to the outlet opening of the waste tank for establishing a partial vacuum in the waste tank, a switch, a pressure sensor positioned to sense the pressure difference between a location that is in communication with the interior space of the sewer pipe and a location that is in communication with the interior space of the bowl, and control means responsive to actuation of the switch to compare the sensed pressure difference with a predetermined threshold level and, if the sensed pressure difference exceeds the threshold level, to open the discharge valve, and otherwise to actuate the vacuum generator and open the discharge valve when the pressure difference exceeds the predetermined threshold level.

8. A vacuum sewage system which comprises:

at least one waste-receiving bowl defining an interior space for receiving waste material and having an outlet, a waste tank comprising a receptacle portion for receiving sewage and a dome structure which is in open communication with the receptacle portion, projects upwardly from the receptacle portion, and of which the horizontal sectional area is substantially smaller than the maximum horizontal sectional area of the receptacle portion, the dome structure defining an inlet opening and an outlet opening, a sewer pipe connected to the inlet opening of the the waste tank, a discharge valve connected between the sewer pipe and the outlet of the waste-receiving bowl for controlling passage of material between the waste-receiving bowl and the sewer pipe, a vacuum generator, an exhaust duct connecting the vacuum generator to the outlet opening of the waste tank for establishing a partial vacuum in the waste tank, a pressure sensor positioned to sense the pressure difference between a location that is in communication with the interior space of the sewer pipe and a location that is in communication with the interior space of the bowl, and control means responsive to the pressure sensor for operating the vacuum generator to maintain the sensed pressure difference above a predetermined threshold level.

9. A vacuum sewage system which comprises at least one sewage-producing unit, a waste tank, a sewer pipe connecting the sewage producing unit to the waste tank, a vacuum generator, and an exhaust duct connecting the vacuum generator to the waste tank for establishing a partial vacuum in the waste tank, said tank comprising a receptacle portion for receiving sewage and a dome structure which is in open communication with the receptacle portion, projects upwardly from the receptacle portion, and of which the horizontal sectional area is substantially smaller than the maximum horizontal sectional area of the receptacle portion, the dome structure defining an inlet opening coupled to the sewer pipe and an outlet opening coupled to the exhaust duct, and wherein the tank further comprises a deflector plate mounted inside the dome structure in spaced relationship from the inlet opening and extending transversely relative to the central axis of the inlet opening, whereby solid or liquid material entering the tank by the way of the inlet opening at high speed strikes the deflector plate and is decelerated.

10. A waste tank for a vacuum sewage system, said tank having a lower portion for receiving sewage and also having an upper portion in open communication with the lower portion, and the upper portion of the tank being a generally cylindrical dome structure which has a central axis and defines an inlet opening for admitting air and sewage to the tank and an outlet opening for exhausting air from the tank, the inlet opening having a central axis which is substantially perpendicular to the central axis of the dome structure, and the tank further comprising a deflector plate mounted inside the dome structure in spaced relationship from the inlet opening and extending transversely relative to the central axis of the inlet opening.

11. A waste tank according to claim 10, comprising a duct which is disposed inside the dome structure and through which air flows in order to reach the outlet opening, and wherein the tank further comprises a closure member which is disposed inside the dome structure for inhibiting entry of solid or liquid material into the duct.

12. A waste tank according to claim 11, wherein the dome structure has a side wall and a top wall, the duct defines an inlet port, and the closure member is a reversing member having an inner periphery and an outer periphery, the closure member being secured at its inner periphery about the inlet port of the duct and having a first condition in which the outer periphery is below the top wall of the dome structure and air that enters the dome structure is able to pass to the inlet port, and a second condition in which the outer periphery engages the top wall of the dome structure and inhibits passage of material to the inlet port.

13. A waste tank according to claim 10, comprising a seating member defining a circular seating surface that bounds an inlet to a conduit through which air flows in order to reach the outlet opening of the tank, and wherein the tank further comprises a generally circular reversing closure member that has an outer periphery and is secured to the dome structure at a position inward of its outer periphery, the closure member having a first condition in which the outer periphery is below the seating surface, and air that enters the dome structure is able to pass to the outlet opening of the tank by way of the space bheween the outer periphery of the closure member and the seating surface, and a second condition in which the outer periphery of the closure member engages the seating surface and inhibits passage of material to the outlet opening.

14. A waste tank for a vacuum sewage system, the tank having a lower portion and an upper portion and defining an inlet opening for admitting air and sewage to the tank and an outlet opening for exhausting air from the tank, and the tank also comprising a seating member defining a circular seating surface that bounds an inlet to a conduit through which air flows in order to reach the outlet opening of the tank, and a closure member which is disposed inside the upper portion of the tank for inhibiting entry of solid or liquid material into the conduit, the closure member being a reversing member that has an outer periphery and is secured to the tank at a location inward of its outer periphery, the closure member having a first condition in which the outer periphery is below the seating surface and air that enters the tank is able to pass to the conduit and a second condition in which the outer periphery engages the seating surface and inhibits passage of material to the conduit.

15. A waste tank for a vacuum sewage system, said tank comprising a wall having a top portion and also having a dome structure which projcts upwardly from the top portion of the wall and of which the horizontal sectional area is substantially smaller than the maximum horizontal sectional area of the tank, the dome structure defining an inlet opening for admitting air and sewage to the tank and an outlet opening for exhausting air from the tank and the tank also comprising a duct which is disposed inside the dome structure and through which air flows in order to reach the outlet opening, and wherein the tank further comprises a closure member which is disposed inside the dome structure for inhibiting entry of solid or liquid material into the duct.

16. A waste tank according to claim 15, wherein the dome structure has a side wall and a top wall, the duct defines an inlet port, and the closure member is a reversing member having an inner periphery and an outer periphery, the closure member being secured at its inner periphery about the inlet port of the duct and having a first condition in which the outer periphery is below the top wall of the dome structure and air that enters the dome structure is able to pass to the inlet port, and a second condition in which the outer periphery engages the top wall of the dome structure and inhibits passage of material to the inlet port.

17. A waste tank according to claim 16, wherein the closure member is made of silicone rubber and its thickness decreases over at least a part of the range of its radius from its outer periphery to its inner periphery.

18. A waste tank for a vacuum sewage system, said tank comprising a wall having a top portion and also having a dome structure which projects upwardly from the top portion of the wall and of which the horizontal sectional area is substantially smaller than the maximum horizontal sectional area of the tank, the dome structure defining an inlet opening for admitting air and sewage to the tank and an outlet opening for exhausting air from the tank, and the dome structure having a side wall and a top wall and the outlet opening being formed in the side wall, and wherein the waste tank further comprises a cyclonic separator fitted in the outlet opening for removing water entrained in air leaving the tank and returning such water to the tank, the cyclonic separator comprising first and second ducts which are in end-to-end alignment but are spaced from each other, inlet means for introducing air into the first duct in a manner such as to impart a rotational component of velocity to the air, and a shell which is coupled to the first and second ducts and has a wall portion which is at a greater distance from the central axis of the first and second ducts than the walls of the first and second ducts and is disposed so that it extends over a portion of the common axis corresponding to the space between the first and second ducts.

* * * * *